United States Patent [19]

Havenith et al.

[11] Patent Number: 4,915,722

[45] Date of Patent: Apr. 10, 1990

[54] PROCESS AND APPARATUS FOR MANUFACTURING A CURVED SHEET OF GLASS

[75] Inventors: Hubert Havenith, Wurselen, Fed. Rep. of Germany; Herbert Radermacher, Raeren, Belgium; Hans-Werner Nowoczyn, Aachen, Fed. Rep. of Germany; Benoit D'Iribarne, Aachen, Fed. Rep. of Germany; Hans-Werner Kuster, Aachen, Fed. Rep. of Germany; Luc Vanaschen, Eupen, Belgium

[73] Assignee: Saint-Gobain Vitrage, Courbevoie, France

[21] Appl. No.: 305,705

[22] Filed: Feb. 3, 1989

[30] Foreign Application Priority Data

Feb. 6, 1988 [DE] Fed. Rep. of Germany ....... 3803575

[51] Int. Cl.$^4$ ........................................... C03B 23/023
[52] U.S. Cl. ....................................... 65/106; 65/163; 65/273; 65/290; 65/291
[58] Field of Search ................. 65/106, 160, 163, 273, 65/287, 289, 290, 291

[56] References Cited

U.S. PATENT DOCUMENTS 4,661,141  4/1987  Nitschke et al. ...................... 65/273

Primary Examiner—Joye L. Woodard
Attorney, Agent, or Firm—Oblon, Spivak, McClelland, Maier & Neustadt

[57] ABSTRACT

A process for bending a glass sheet, in particular one for motor vehicles, with curved areas having small radii of curvature. The bending device used is a bending press having a male type mold and a female type mold. The female type mold consists of at least two mold parts hinged together. After part of the glass sheet heated to bending temperature has been received by the bending press, at least one swivelling mold part of the female type mold is swivelled around the swivel axis, against the male type mold. An adjustable electric motor serves as the drive motor to move the swivelling mold parts. The angular velocity of the swivel action of the swivelling mold parts during the bending process is adjusted as a function of the temperature of the glass sheet and the desired degree of deformation.

10 Claims, 3 Drawing Sheets

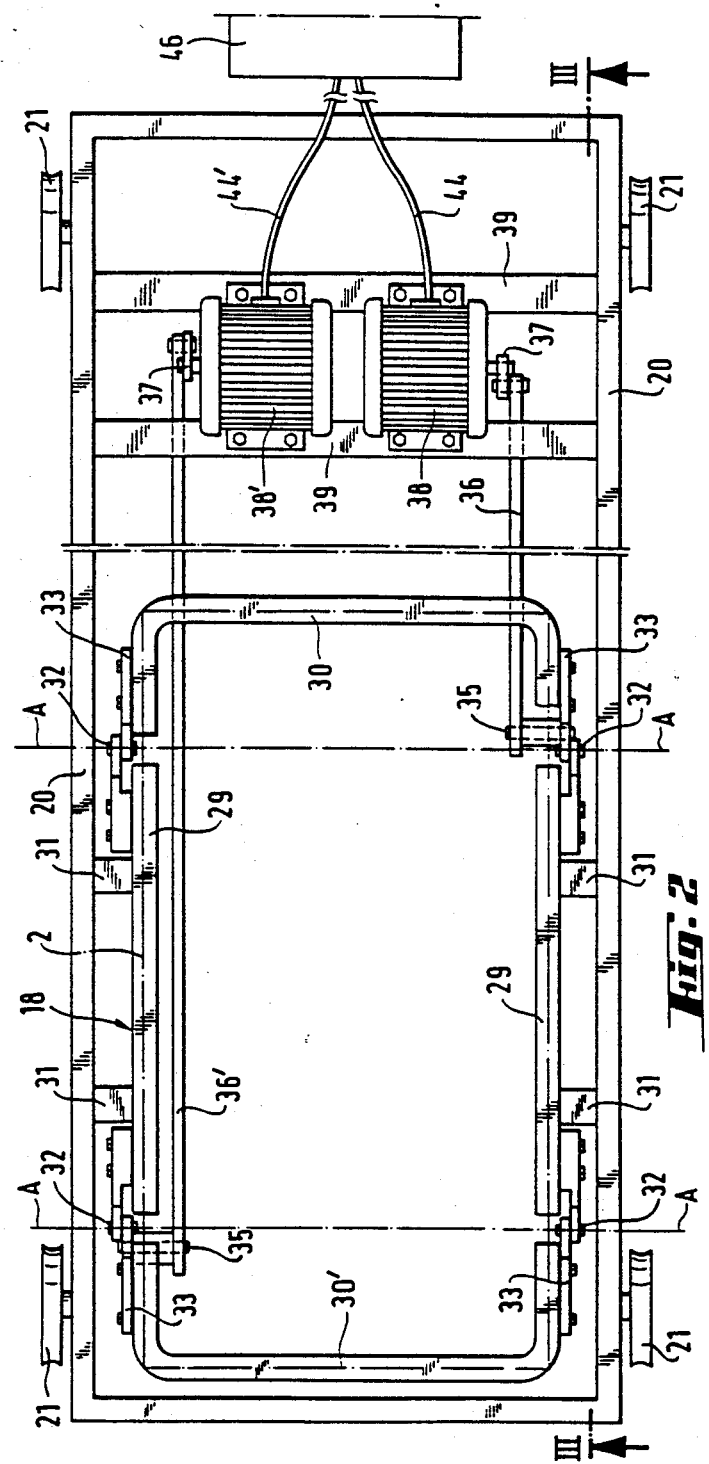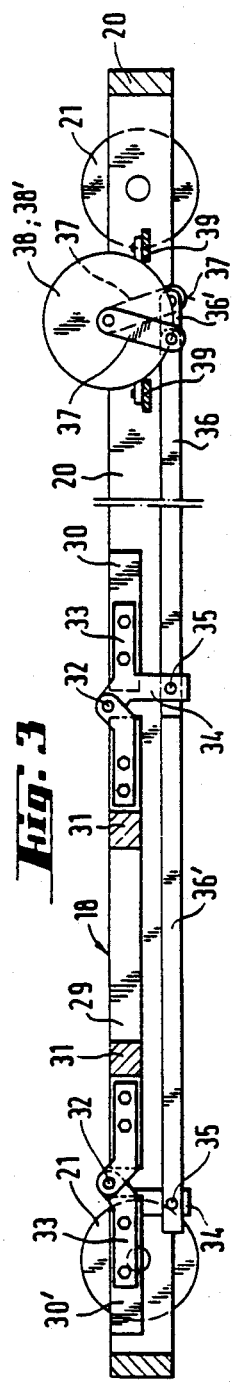

PROCESS AND APPARATUS FOR MANUFACTURING A CURVED SHEET OF GLASS

FIELD OF THE INVENTION

This invention relates to a process for manufacturing a curved sheet of glass, in particular for manufacturing a sheet of glass with curved areas having small radii of curvature, with the aid of a bending press comprising a male mold and a female mold, whereby the female mold consists of at least two mold parts hinged together, and after the bending press has received part of the sheet of glass heated to bending temperature, at least one hinged mold part of the female mold is swivelled around the swivelling axis, against the male mold.

BACKGROUND OF THE RELATED ART

Bending processes of this kind are known in various forms, both in the bending of sheets of glass in a vertical position and in the bending of sheets of glass in a horizontal position. In the vertical techniques, the sheets of glass are as a rule carried into the bending press on nippers. When bending the sheets of glass in a horizontal position, the glass sheets are generally heated to bending temperature in a roller type continuous furnace and brought into the bending press in a horizontal position.

The manufacture of thermally prestressed glass sheets with curves of varying degrees of sharpness, for example the manufacture of glass sheets with curved ends, as for instance used for car rear windows, is a critical process, particularly when the glass sheets are heated to bending temperature in a roller type furnace in a horizontal position. In such cases, more frequently than elsewhere, the curved glass sheets break during the abrupt cooling that follows the bending process for the purpose of thermal prestressing.

The increased risk of breakage is attributable to the increased risk of distortion to which the glass sheets are subject under the effect of their own weight when transported horizontally, for the following reason. To counter the risk of distortion, the glass sheets are heated to a temperature at only the lower limit of the temperature range required for bending and subsequent prestressing. However, the lower the temperature at the moment of bending, the greater the risk that glass sheets to be sharply curved will fail to withstand the bending process itself or the subsequent prestressing process and will break.

SUMMARY OF THE INVENTION

The invention has as an object the carrying out of a process for the manufacture of glass sheets, in particular of glass sheets with curved areas, in such a way that the risk of the glass sheet being destroyed during bending or prestressing is largely eliminated while also improving the form retention of the glass sheets.

According to the invention, this problem is solved by selecting the angular velocity of the swivel movement of the swivel mold parts during the bending process as a function of the temperature of the glass sheet and the degree of deformation.

The invention makes use of the known fact that when bending glass sheets, the rate of deformation takes on considerable significance. Plastic deformation of the glass sheet is known to occur through transposition processes in the glass structures, these transposition processes taking differing amounts of time as a function of the viscosity of the glass. If deformation takes place faster than the transposition processes within the glass structure, the internal stresses in the glass cannot be reduced sufficiently quickly, and can locally exceed the strength of the glass, which then leads to breakage. According to the invention, these relationships are utilized in such a way that the rate of bending is specifically matched to the relevant state of viscosity of the glass. The rate of bending is thus optimized by being as high as possible to enable the shortest possible bending times with minimum temperature loss in the bending press, while enabling the necessary transposition processes to take place and thus prevent dangerous internal stresses from occurring in the glass.

In contrast to the customary method, therefore, the angular velocity on swivelling the hinged mold parts of the bending press is adjusted, taking account of the geometrical form desired in each case and the temperature of the glass sheet within the bending press. With very constant production conditions, the optimum angular velocity of the pivot movement can be determined for a given form of sheet and kept constant during the production of this form of sheet.

Since as a rule small temperature variations are unavoidable in practice, but in view of their marked effects on the visco-elastic behavior of the glass in this critical temperature range they can be of considerable significance, in a further development of the invention, the process can be conducted in such a way that the temperature of each individual glass sheet is measured prior to entering the bending press and the angular velocity of the swivel movement of the hinged mold parts of the bending press is adjusted individually as a function of the measured temperature.

In a beneficial further development of the invention, the angular velocity of the swivel movement of the hinged mold parts during a movement process is altered in such a way that it is reduced from a high value at the start of the bending process to a low value at the end of the bending process. This reduction of the bending velocity can take place in stages. More desirably, however, the reduction of the rate of bending during a bending process takes place continuously in accordance with a function that takes account of the degree of deformation and the reduction in the temperature of the glass sheet that occurs due to heat transfer during the bending process.

A specific alteration of the angular velocity of the hinged mold parts during the bending process in accordance with the invention can also be achieved wherein the temperature of the glass sheet at the start of the bending process and the geometric form of the glass sheet desired in each case are used to determine the force to produce the swivel movement at the start of the bending process and this force is held constant throughout the entire swivel movement. Given the increased resistance on continuing bending of the glass sheet as a result of the reduction in temperature and increasing deformation, the constant force leads to the angular velocity of the hinged mold parts being automatically slowed down to the required extent.

Finally, in a further development of the invention, it is also possible to proceed in such a way that the force to produce the swivel movement of the hinged mold parts is altered during the swivel movement as a function of their angular position, in accordance with a given program, to achieve the required slowing down of the swivel movement.

In an appropriate further development of the invention, with a total bending time that is shorter or longer than a previous glass sheet, the shortening or lengthening of the bending time can be utilized in such a way that the time at which the subsequent glass sheets are laid on the conveyor carrying the glass sheets through the heating furnace is altered in accordance with the shortening or lengthening of the bending time, i.e., the initiation of conveying is controlled by the timing of the bending step. In this way, cycle times in a manufacturing line can be adjusted in the optimum manner and thus the capacity of a manufacturing line can be utilized in the optimum manner.

Basically, the process according to the invention can be used in bending both vertically suspended glass sheets and horizontally aligned glass sheets. It is used to particular advantage with glass sheets in a horizontal position in the heating furnace and bending press, since the difficulties mentioned at the beginning are there observed more frequently than when bending vertically suspended glass sheets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a plan view of a frame bending mold on a mobile carriage used in the plant shown in FIG. 1;

FIG. 3 shows the arrangement shown in FIG. 2 in a section along line III—III.

DETAILED DESCRIPTION OF THE PREFERRED EMBODIMENTS

Figure 1:
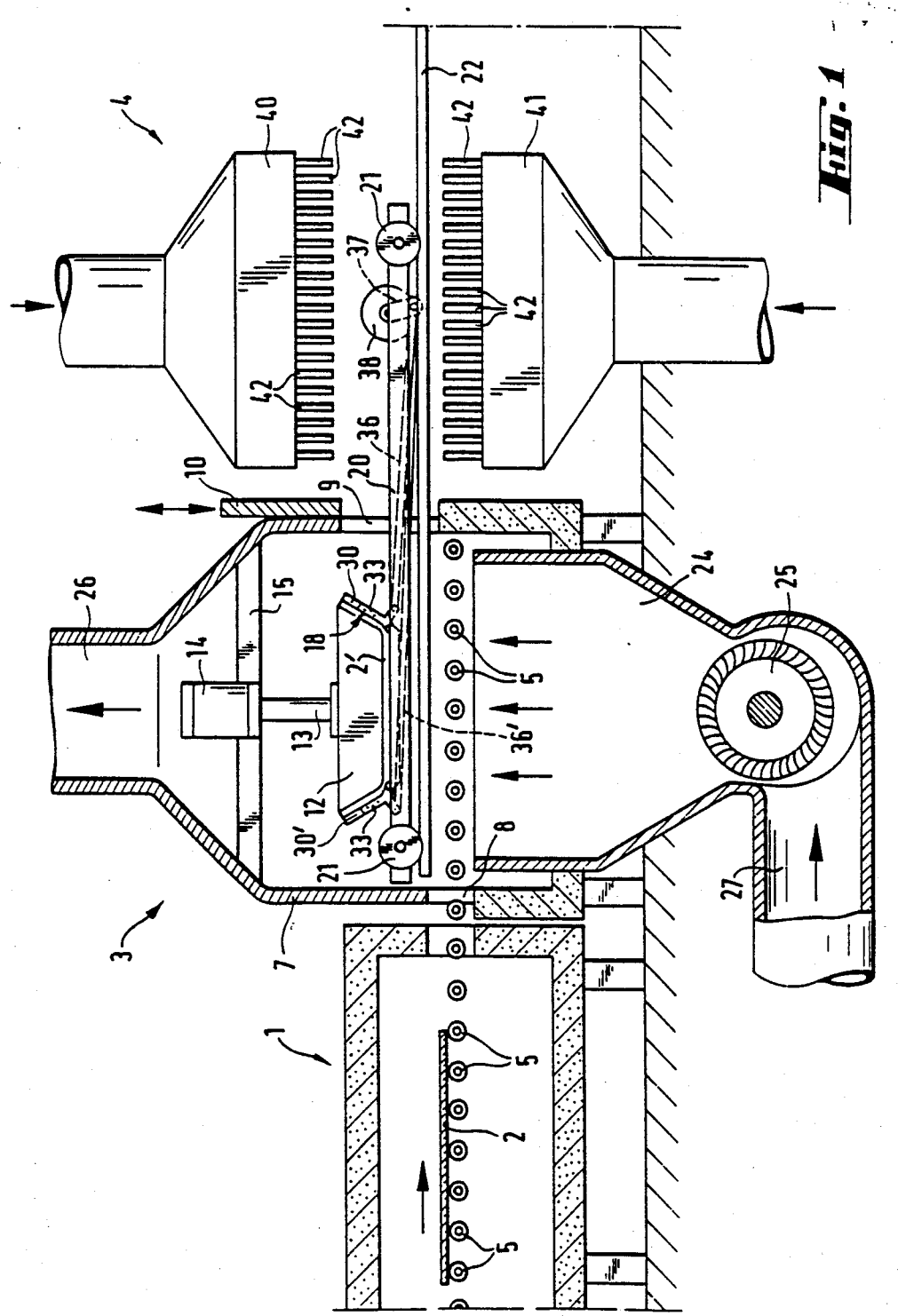
FIG. 1 shows a longitudinal section through a plant for bending and prestressing motor vehicle glass sheets.

The plant shown in FIG. 1 comprises a horizontal continuous furnace 1 for heating the glass sheets 2 to bending temperature, a bending station 3 next to the continuous furnace 1 and a prestressing station 4 in which the curved glass sheets are thermally prestressed by abrupt cooling.

The glass sheets 2 are conveyed on a conveyor belt consisting of powered conveyor rollers 5 through the furnace 1 into bending station 3, in which they are bent to the required form.

Bending station 3 is surrounded by a closed housing 7 provided with an opening 8 for entry of the heated glass sheets and also with an opening 9 through which the bent glass sheets are conveyed to the bending mold or onto a suitably curved carrying frame from the bending station into the prestressing station. Opening 9 is closed by sliding door 10.

The actual bending devices are arranged within the housing 7. They consist of a full area bending mold 12 arranged above the conveyor rollers 5 and a frame bending mold 18 that works in conjunction with it. The full area male type bending mold 12 is arranged on a piston rod 13 and is guided by bearings (not shown) so as to be raised and lowered with the aid of cylinder 14. Cylinder 14 is secured to cross beams 15 inside housing 7. The frame bending mold 18 is in turn arranged on a carriage 20 provided with wheels 21 running on rails 22.

In the bending station surrounded by housing 7, under the conveyor rollers 5, a flow duct 24 opens out, through which a current of hot air is directed from beneath against the glass sheet. The hot current of air is produced at the requisite rate of flow and pressure by fan 25. Above the bending devices, the hot flow of gas flows through duct 26 and in the circuit is fed through duct 27 back to the fan 25.

The bending process proceeds as follows: the glass sheet 2 heated to the bending temperature runs through the opening 8 into the bending station. At this time, the carriage 20 with the frame bending mold 18 is located outside the bending station and opening 9 is closed by door 10. Bending mold 12 is located in its lower position just above the conveyor rollers 5. As soon as the glass sheet 2 has reached its end position below bending mold 12, the conveyor rollers 5 stop, and fan 25 is switched on or a slide valve (not shown) is opened, through which the flow of hot air is released. As a result of the dynamic pressure of the flow of hot air, the glass sheet 2 is lifted from the conveyor rollers 5 and pressed against the bending mold 12 so as to become a partially bent glass sheet 2'. Now, the hot flow of air being maintained, the bending mold 12 is lifted to an upper position with the aid of the pressure cylinder 14. The glass sheet 2' rises with the bending mold 12, optionally with the aid of grasping means (not shown). Door 10 is then opened, and the carriage 20 with the frame bending mold 18 is driven into the bending station and positioned under the bending mold 12. As soon as the frame bending mold 18 has reached its position under the bending mold 12, bending mold 12 with glass sheet 2', which has already partially assumed the form of bending mold 12, is lowered until the center part of glass sheet 2' touches frame bending mold 18.

The frame bending mold 18 has moving side parts 30 which swivel about pivots 32. These moving side parts 30 are now swivelled up at separate speeds and press the side end areas of glass sheet 2' against the corresponding areas of bending mold 12.

Following the completion of the bending process, bending mold 12 is released from glass sheet 2' and brought to its upper position. The curved glass sheet 2', lying on frame mold 18, is then taken to the prestressing station 4. In the prestressing station, which contains an upper blowing box 40 and a lower blowing box 41, each of which has a number of nozzles 42, the curved glass sheet is prestressed by being blasted with air.

The construction of the frame bending mold 18 is shown in detail in FIGS. 2 and 3. The frame bending mold 18 consists of a frame-shaped central part 29 and two side parts 30 which are also frame shaped, and which in each case swivel about a swivel axis A—A. The middle part 29 is rigidly secured to the carriage 20, also frame shaped, by means of fixing plates 31. The joint allowing the swivel movement of side parts 30 and 30' about the axis A—A in each case consists of a pivot 32 provided on the middle part 29, and a plate 33 working together with the pivot 32 and provided on a side part 30. Each plate 33 is in turn provided with a lever 34 aligned approximately vertically downwards. At the end of each lever 34 is a pin 35 upon which a thrust rod 36 or 36' acts. Each thrust rod 36 or 36' is hinged at its other end to the crank arm 37, secured to the shaft of an electric motor 38 or 38'. Electric motors 38 and 38' are electric motors which may be held in the stopped condition and there apply a certain adjustable torque. The electric motors used here are accordingly designated "torque motors". Different types of motors may be used for this purpose. Low inertia direct current disk armature motors constructed with permanent magnets and having an air core armature have proved successful for the purpose. The torque generated by such motors in the stopped condition is directly proportional to the current. Electric motors 38 and 38' are supplied with direct current by suitable current regulating devices (not shown). The electric motors 38 and 38' are arranged on a suitable support 39, secured to the carriage 20.

Electric motors 38 and 38' are connected via trailing cables 44 and 44' with a control/regulating unit 46, supplying an electrical output producing the required swivel velocity of side parts 30 and 30', for example a corresponding electrical voltage or a corresponding frequency. The electrical output of the control/regulating unit 46 and its timing during a swivel process are determined by the control/regulating unit 46 as a function of e.g., the geometrical form of the glass sheet, the starting temperature of the glass sheet and the temperature pattern of the glass sheet throughout the bending process, according to a given program.

Figure 4:
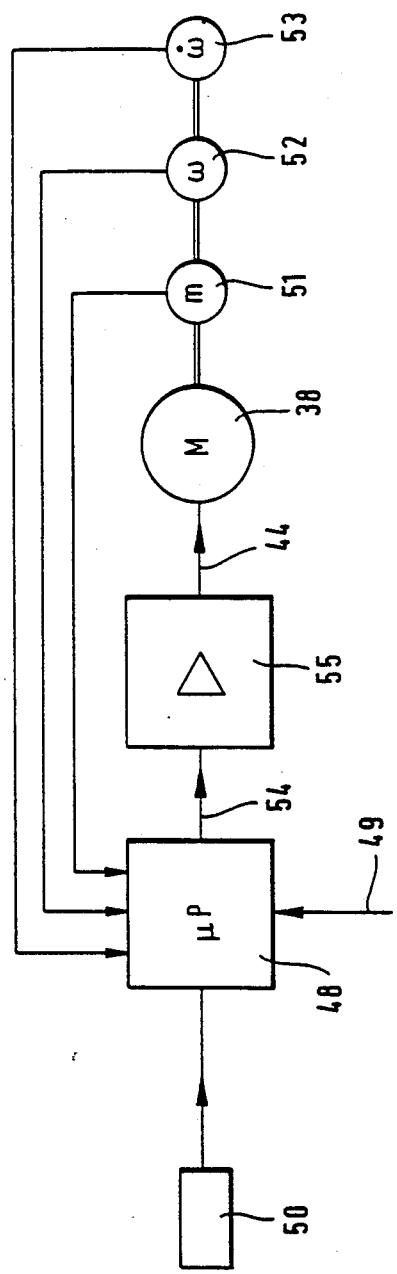
FIG. 4 is a schematic representation of a control circuit producing the swivel movement of a mold part.

FIG. 4 schematically shows a possible design for the control/regulating unit 46. The illustrated control/regulating unit 46 for torque motor 38 comprises a processor 48 with program and data entry 49. For example, the program and data entry 49 can be for receiving stored bending speed or torque profiles based on various glass sheet characteristics such as glass sheet starting temperature and/or glass sheet form after bending.

The processor 48 is also driven by a input from temperature transmitter 50, which detects the temperature of the glass sheet before and possibly during the bending process, and a measuring element 51 for monitoring the torque exerted by the torque motor, a measuring element 52 for monitoring the angle of rotation ω of the torque motor/swivelling part of the bending mold and a measuring element 53 for the angular velocity ω of the side part 30. From these data or from part of these data, the processor 48, in accordance with the program provided, calculates the process parameters required in each case so that the side parts 30 bend the glass sheet 2 at a desired speed.

The servo-amplifier 55 is driven by the processor 48 via line 54, which amplifies signals from the processor to control drive motor 38 via line 44.

Depending on the form of the glass sheet and the type of process, the following operating modes may be carried out with a control/regulating device of this kind:

1. Regulation of the torque exerted by drive motor 38:
   (a) Bending of the glass sheet with a regulated constant bending moment;
   (b) Bending of the glass sheet with a variable bending moment regulated as a function of the angle of rotation of the side parts;
   (c) Bending of the glass sheet with a bending moment regulated as a function of the temperature of the glass sheet;
   (d) Bending of the glass sheet with a bending moment regulated as a function of the angle of rotation of the side parts and the temperature of the glass sheet.

2. Regulation of the angular bending velocity of the side parts:
   (a) Bending with a constant velocity regulated as a function of the form and initial temperature of the glass sheet;
   (b) Bending with a variable velocity regulated as a function of the angle of rotation of the side parts;
   (c) Bending with a variable velocity regulated as a function of the form of the glass sheet and the temperature pattern of the glass sheet during the bending process;
   (d) Bending with a variable velocity regulated as a function of the angle of rotation of the side parts and the temperature pattern of the glass sheet during the bending process.

3. Furnace cycle time control:
   Since, in the case of complex sheet bending, the furnace cycle time is determined by the bending time, it is possible to calculate the bending time with the help of the processor as a function of the form of the sheet and the temperature of the sheet, and thus to control the furnace cycle time.

Obviously, numerous modifications and variations of the present invention are possible in light of the above teachings. It is therefore to be understood that within the scope of the appended claims, the invention may be practiced otherwise than as specifically described herein.

What is claimed:

1. A process for manufacturing a curved glass sheet, comprising the steps of:
   determining at least one characteristic of a heated glass sheet;
   bending the heated glass sheet having at least one characteristic in a bending press having a male type mold and a female type mold cooperating therewith to produce a bent glass sheet, the female type mold having at least one mold part which can swivel to bend a glass sheet in the bending press; and
   controlling the swivelling of said at least one mold part during said bending step as a function of said characteristic of the heated glass sheet being bent;
   wherein said at least one characteristic is at least one of a temperature of the heated glass sheet before said bending step and a change in the temperature of the heated glass sheet during said bending step, wherein said at least one mold part is hinged and wherein said controlling step comprises controlling an angular velocity of the swivelling of said at least one mold part as a function of said characteristic by reducing said angular velocity between the beginning of said bending step and the end of said bending step.

2. The process of claim 1 wherein said reducing step is a continuous reducing step.

3. The process of claim 2 wherein a swivelling force of the swivelling of said at least one mold part during said bending step is constant throughout said bending step and is determined as a function of the temperature of the glass sheet at the beginning of said bending step and as a function of the required geometric form of the glass sheet at the end of the bending step.

4. The process of claim 1 including the steps of:
   heating the glass sheet in a heating furnace;
   conveying the heated glass sheet in a horizontal position on a conveyor between said heating furnace and said bending press.

5. The process of claim 4 wherein the initiation of said conveying step is controlled as a function of the length of said bending step.

6. The process of claim 4 including the step of rapidly cooling the bent glass sheet in a prestressing station.

7. An apparatus for the manufacture of curved glass sheets, comprising:
   means for detecting at least one characteristic of a heated glass sheet;
   a bending station having a male type mold and a cooperating female type mold, said female type mold having at least one swivelable mold part which can swivel against the male type mold during a bending operation for bending a heated glass sheet in said bending station;
   means for conveying a heated glass sheet into said bending station and between said male and female type molds;
   electric motor means for swivelling said swivelable mold part; and
   means for controlling said electric motor means as a function of the at least one characteristic of a heated glass sheet being bent by reducing the angular velocity of the swivelling of said mold part between a beginning and an end of the bending operation,
   wherein said means for detecting comprise means for detecting at least one of a starting temperature of a heated glass sheet and a change in temperature of the heated glass sheet during said bending step.

8. The apparatus of claim 7 wherein said controlling means further comprises:
   means for controlling a swivelling torque of said electric motor means in accordance with said at least one detected characteristic.

9. The apparatus of claim 8 including means for monitoring at least one of a torque of said electric motor means, an angular swivelling position of said at least one swivelable mold part and the speed of said electric motor means.

10. The apparatus of claim 7 including a heating furnace upstream from said bending station in a conveying direction and a prestressing station downstream from said bending station in said conveying direction.

* * * * *